INVENTOR.
ADOLF H. FRÖHLICH
E. J. HARRIS
BY
ATTORNEY

INVENTOR.
ADOLF H. FRÖHLICH
E. d. HARRIS
BY
ATTORNEY

United States Patent Office 2,880,458
Patented Apr. 7, 1959

2,880,458
APPARATUS AND METHOD FOR SHAPING AND VULCANIZING PNEUMATIC TIRES

Adolf Heinrich Fröhlich, Hannover, Germany, and Edward J. Harris, Akron, Ohio; said Fröhlich assignor to The Cleveland Trust Company, Cleveland, Ohio, as trustee Application January 7, 1955, Serial No. 480,517
23 Claims. (Cl. 18—17)

This invention relates to pneumatic tire manufacture, and in particular, relates to apparatus employed in shaping and vulcanizing pneumatic tires.

For several years past, the manufacture of pneumatic tires has been carried out by first building up a plurality of uncured fabric plies on a building drum, so as to form what is conventionally known as a "flat-built" tire. This "flat-built" tire of uncured stock is subsequently transferred to a vulcanizing press having a pneumatic former that is capable of being positioned interiorly of the flat-built" tire so as to shape and retain the uncured tire in toroidal form so that the same may be vulcanized into a finished product. After the period of vulcanization has transpired, the pneumatic former is deflated and withdrawn from the interior of the vulcanized tire for re-use in subsequent operations.

In the past several years, various types and forms of hydraulic and pneumatic formers have been advanced for shaping the "flat-built" tires into their required toroidal shape during the period of vulcanization. These various types of formers have included air and steam operated formers, as well as formers that employ hot water or other hydraulic fluids as the vulcanizing medium. However, without exception, the inflating and deflating of these pneumatic formers has been timed to coincide with the opening and closing of the vulcanizing press, with the result that the pneumatic former could not, for example, be transferred from its position interiorly of the shaped tire.

As is well known in the prior art, the prime function and purpose of the penumatic former during the vulcanization period is to urge the external surface of the "flat-built" tire into complete and full registry with the complemental mold sections of the vulcanizing press; and accordingly, it has always been considered proper procedure to maintain the pneumatic former in its fully inflated condition during the entire period of vulcanization, to thus insure complete contact between the uncured tire and the complemental mold sections of the vulcanizing press.

It has been discovered, however, that the pneumatic former need only be fully inflated for a fraction of what is now considered to be the normal vulcanizing period. Thus, while the present day practice dictates a vulcanizing period that may range from thirty to forty minutes in duration, it has been found that as a practical matter, the function of the pneumatic former ceases after the first five to seven minutes of this vulcanizing period. This is true in view of the fact that the shaped tire has reached an initial "cure" or "set" that will be retained thereafter regardless of the presence or absence of the pneumatic former. Thus, for all practical purposes, it has been found that it is not necessary that the former be fully inflated after an initial period of vulcanization that operates to "set" the tire in its toroidal shape.

Additionally, it has been found that the presence of this pneumatic former after this period of initial vulcanization is, in actuality, detrimental to the vulcanizing process; because the steam supplied interiorly of the former must first be absorbed through the wall of the former before being introduced against the uncured tire to effectuate vulcanization of the same. This absorption process in the wall of the pneumatic former accordingly increases the amount of time required for vulcanization; with the result that the overall lenght of the vulcanization period is unnecessarily long.

It has been additionally discovered that the vulcanization period can be materially reduced if the pneumatic former is removed from the interior of the shaped tire after an initial vulcanization period of a few minutes duration that operates to initially "cure" or "set" the tire in its final toroidal shape. It is manifest that such withdrawal of the pneumatic former as above described must occur with the vulcanizing press closed for several reasons. First, the heat loss that would occur interiorly must be prevented; and secondly, the pressure must be maintained interiorly to prevent buckling of the tire being cured. Additionally, once the mold sections were opened it would be impossible to re-close the same in view of the fact that the same have been "stripped" from the design imparting surfaces of the molds.

Accordingly, it is one object of this invention to provide a vulcanizing press equipped with a pneumatic former that can be withdrawn from its position interiorly of a shaped tire during the vulcanization process, without opening the mold sections of the vulcanizing press.

It is a further object of this invention to provide a vulcanizing press capable of vulcanizing pneumatic tires in a relatively short time.

It is a still further object of this invention to provide a vulcanizing press having a two-stage vulcanizing process occurring interiorly of the tire being cured.

It is a still further object of this invention to provide a vulcanizing press having a pneumatic former that can be inserted or withdrawn with respect to the interior of a shaped tire positioned interiorly of the press, and being further characterized by the fact that said insertion or withdrawal can be effectuated without the opening and/or closing of said press.

It is a still further object of this invention to provide a vulcanizing press having a forming element that is subjected to equal pressures interiorly and exteriorly thereof, and being further characterized by the fact that the vulcanizing press includes revolving means for automatically inserting and subsequently withdrawing the former from the interior of the press while the same is closed.

These and other objects of the invention will become more apparent upon a reading of the following specification considered and interpreted in the light of the accompanying drawings.

Figure 1:
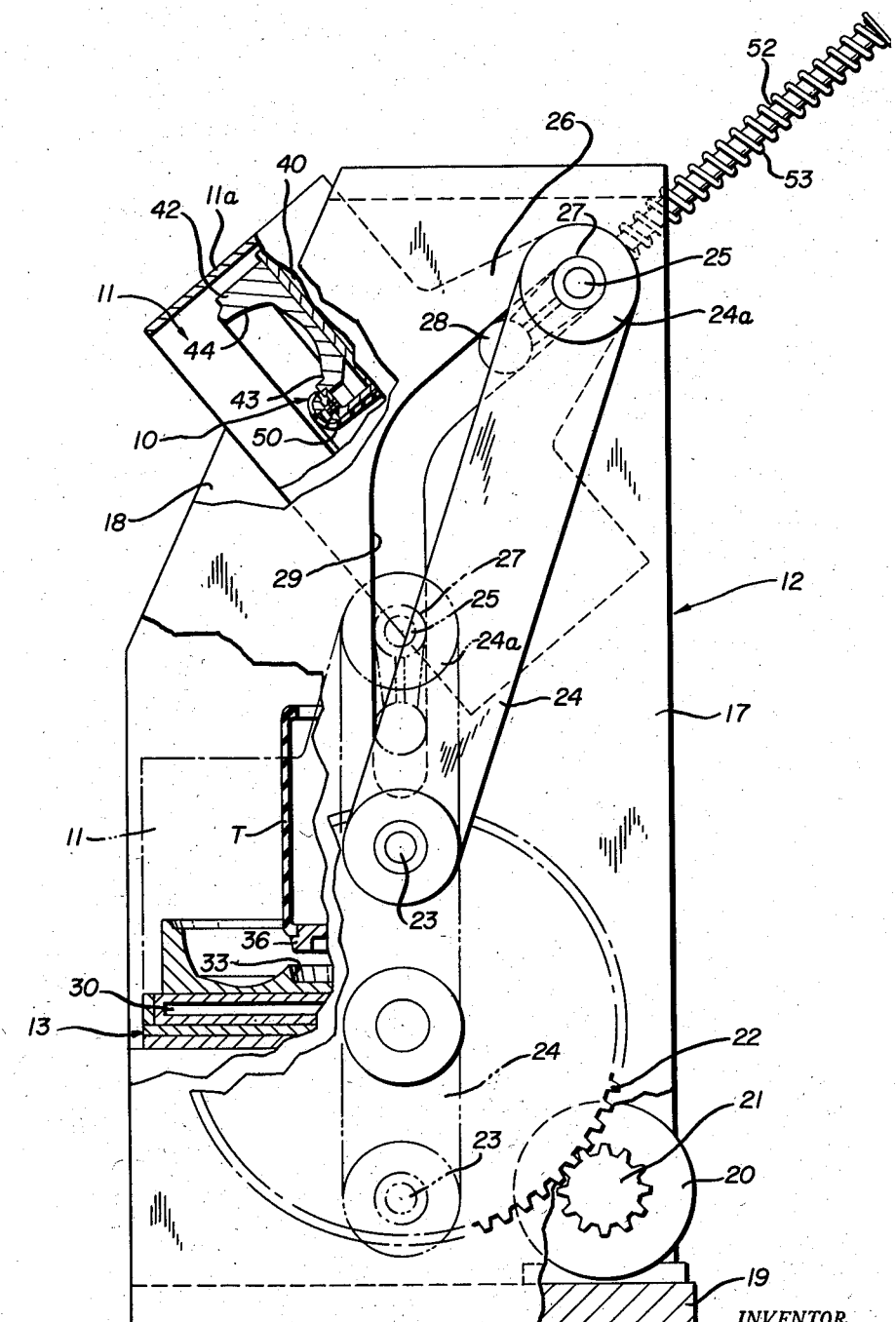
Figure 1 is a side elevation, partly broken away and in section, and illustrating the improved vulcanizing press.

Referring now to the drawings, and in particular to Figure 1 thereof, the improved pneumatic former, generally designated as 10 is shown carried by a relatively movable upper mold section 11 of a vulcanizing press 12, so as to be shiftable into and out of engagement with a stationary mold section 13 to thereby effectuate vulcanization of an uncured tire T that is carried by the lower mold section 13.

In order that a better understanding of the overall vulcanizing press may be had, the component parts thereof, as well as the operating procedure, will be separately discussed.

Description of vulcanizing press

As previously indicated, the vulcanizing press 12 includes a stationary lower mold section 13 and a relatively movable upper mold section 11 that is arranged to approach and depart from its point of contact with the lower mold section 13 in what is conventionally referred to as a "straight line approach."

To this end, the vulcanizing press 12 is shown in Figure 1 as including a pair of spaced uprights 17 and 18, that carry, in known manner, the opposed longitudinal ends of the lower mold section 13 so as to fix the same at a predetermined height above the floor. By like token, the press 12 also includes a tie frame 19 that extends between the uprights 17 and 18 so as to support a motor 20 that is provided for the purpose of rotating a drive pinion 21, that in turn rotates a gear ring 22 of considerably larger diameter. This gear ring 22 includes a pin 23 that serves as a point of pivotal connection for an eccentric link 24, the arrangement being such that the one end 24a of link 24 is received on a shaft 25 that extends between boss extensions 26, 26 that are integral with the upper mold section 11. The shaft 25 also includes a main roller 27, and an integrally connected auxiliary roller 28, both of which are received in the arcuate guide slots 29, 29 that are provided in uprights 17 and 18. In this manner, the upper mold section 11 can be moved between the full and chain-dotted line positions of Figure 1 to effectuate closing of the mold sections 11 and 13.

Figures 2, 5:
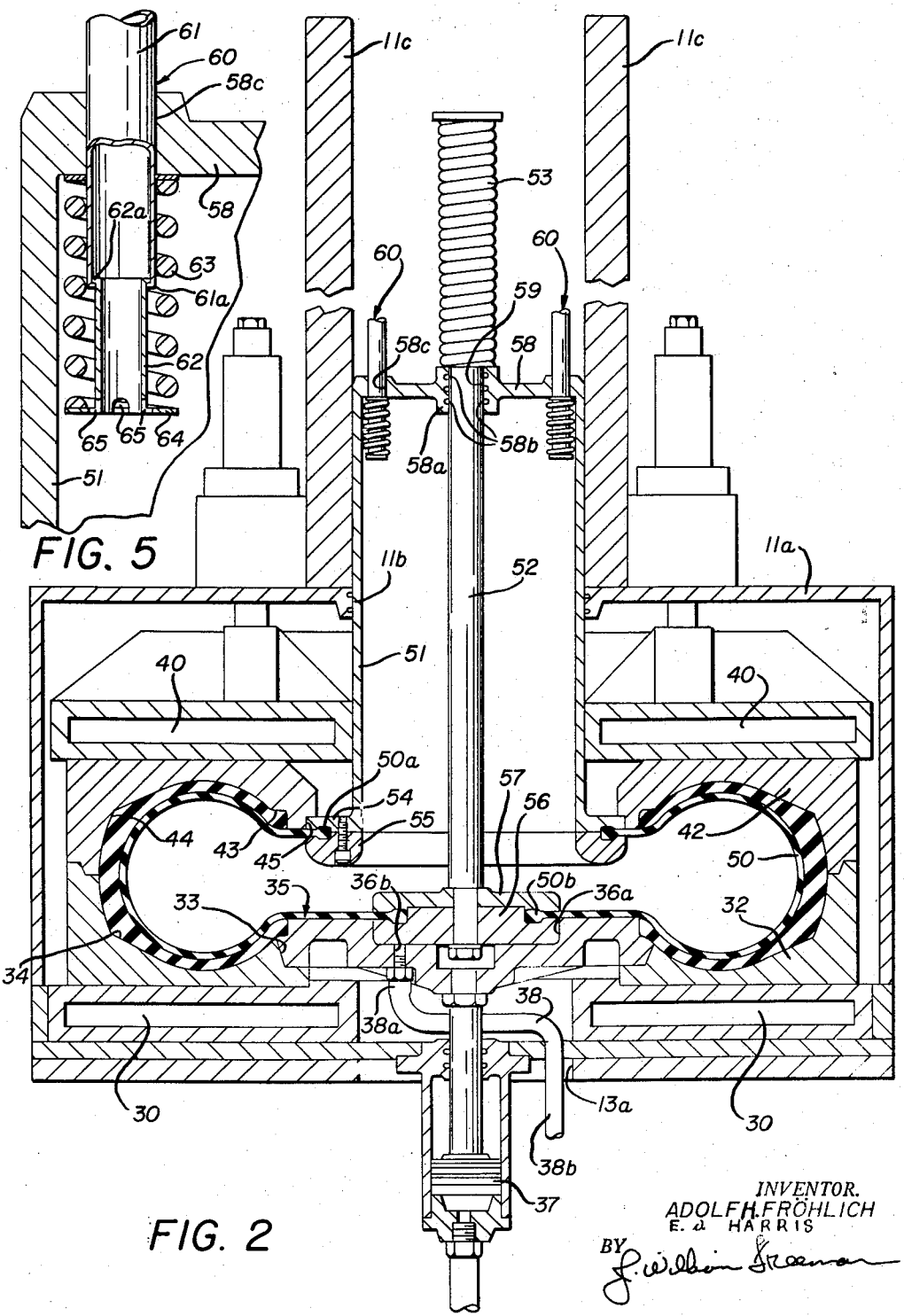
Figure 2 is a view illustrating the improved pneumatic former positioned interiorly of the tire.
Figure 5 is an enlarged detail view of a component element of a pneumatic former.
Figure 3:
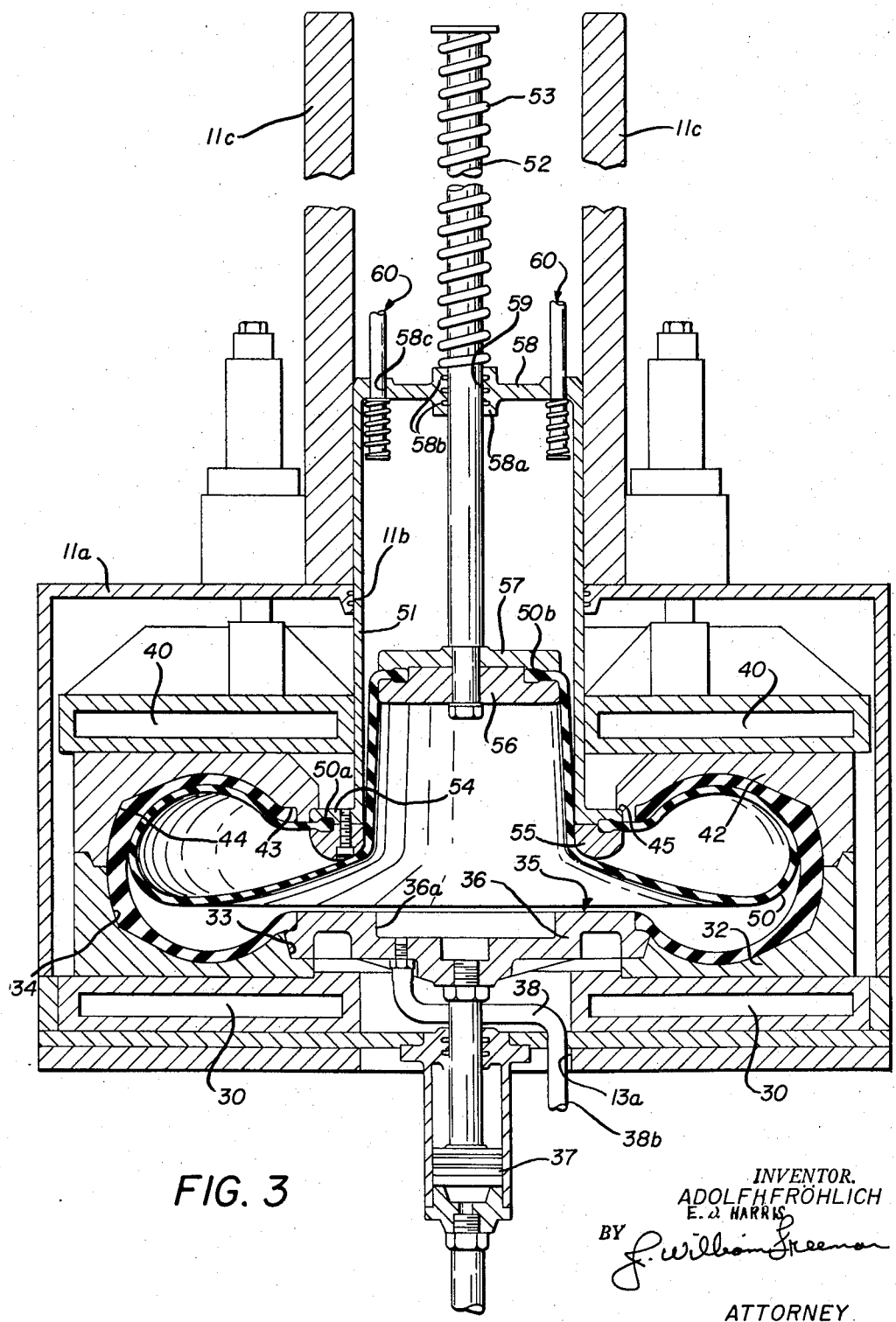
Figure 3 is a view illustrating the pneumatic former at one point of withdrawal from the interior of the pneumatic tire being vulcanized.
Figure 4:
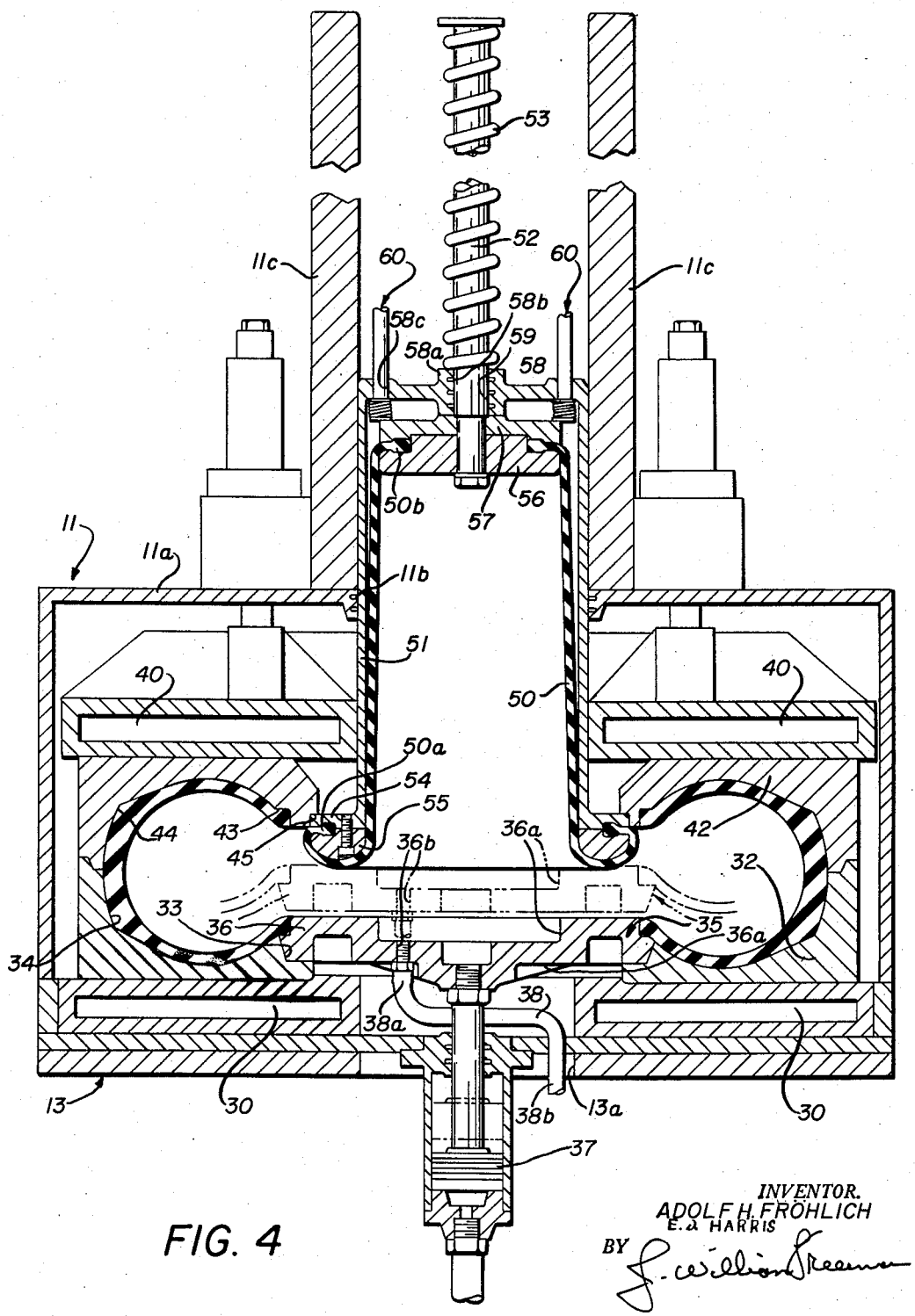
Figure 4 is a view illustrating the pneumatic former being fully withdrawn from the interior of the pneumatic tire being vulcanized, and further illustrating in chain-dotted lines the position of the vulcanized tire after separation of the mold sections.

Referring now to Figures 2, 3 and 4 of the drawings, it will be seen that the lower mold section 13 includes the usual vulcanizing chamber that is arranged in known manner so as to surround a cavity mold 32 that includes a design imparting face 34 that coacts with a bead ejector mechanism 35. The bead ejector mechanism 35 is of the type disclosed in my co-pending application for Vulcanizing Press, Serial No. 441,547, filed July 6, 1954, and in essence, includes a bead ejector ring 36 that is received on an annular seat 33 on a cavity mold 32 so as to be shiftable between the full and chain-dotted line positions of Figure 4 upon actuation of the piston means 37. For purposes to be described, the ejector ring 36 includes a circular under cut 36a that defines a threaded aperture 36b; the arrangement being such that a flexible conduit 38 has one end 38a thereof received in the aperture 36b; while the opposed end 38b thereof extends through the bottom frame 13a of the mold section 13 for attachment in known manner, to a source of pressurized fluid (not shown) such as steam or superheated steam.

By like token, the upper mold section 11 is of conventional construction and includes a vulcanizing chamber 40 that coacts with the chamber 30 to form an overall annular chamber that surrounds the opposite sidewall crown areas of the tire. The upper cavity mold 42 includes the usual design-imparting surface 44, as well as an annular bead seat 43, and is additionally illustrated in Figures 2, 3 and 4 of the drawings as being undercut at 45 to thus provide a seat for the pneumatic former 10 that is secured with respect to the upper mold section 13, in a manner to be described.

To this end, the top plate 11a is shown as being apertured as at 11b so as to define a housing 11c that shields an extensible portion of the former 10.

Description of pneumatic former

The pneumatic former 10 is illustrated as including a resilient tubular bladder 50 that is movable between the position of Figures 2 and 4 as a result of relative movement between a housing 51 and an actuating rod 52, a spring 53 being utilized to normally maintain the above described component elements in the position of Figure 4.

To the end of effectuating the above described movement, the bladder 50 is shown as having one beaded end 50a thereof received against a flange 54 of the housing 51; the usual retaining ring 55 being employed to effectuate the retention of the beaded end 50a with respect to the housing 51. By like token, the opposed beaded end 50b of the bladder 50 is illustrated as being positioned between a retaining ring 56 and a cylindrical head 57 that is carried by the actuating rod 52. In this manner, the bladder 50, which may be of resilient material conventionally utilized in the construction of pneumatic formers, is, in effect, secured at its opposed ends to the housing 51 and the actuating rod 52, with the result that the relative movement between the housing 51 and the rod 52 will cause the bladder 50 to be turned "inside out."

Turning now to the construction of the housing 51 per se, it will be seen that the same is of cylindrical configuration designed to permit reception thereof within the aperture 11b and the cylindrical housing 11c of the upper mold section 11; with the location of the same being determined by the engagement between the flange 54 and the undercut 45. Additionally, the housing 51 includes a dome 58 that is apertured as at 59 to receive the rod 52, the usual boss 58a and packing rings 58b, 58b, being employed in this regard to obviate leakage at this point of sliding contact between the aperture 59 and the rod 52. The dome 58 is also apertured as at 58c for the purpose of receiving a bumper valve 60, the construction of which is best set forth in Figure 5 of the drawings.

This bumper mechanism 60 is illustrated as including telescoping tubular members 61 and 62; the arrangement being such that the female tubular element 61 is received in the aperture 58c, while the male tubular element 62 is maintained in the extended position of Figure 5 by a spring 63 that has the opposed ends thereof respectively seating against the dome 58 and a flange 64 that is provided on one axial end of the male tubular element 62. To the end of limiting the axial movement of the tubular members 61 and 62, the tubular element 61 is shown provided with an inturned radial flange 61a that abuts a radial flange 62a of the tubular element 62. Because the flange 64 is designed to be engaged by the retaining ring 56 upon axial movement upwardly of the rod 52, the lower end of the tubular element 62 (see Figure 5) is shown provided with a plurality of port openings 65, 65 that serve to permit the passage of pressurized fluid from the restricted chamber shown in Figure 4 to the interior of the tubular elements 62 and 61, respectively.

The operation of the vulcanizing press

In use or operation of the improved vulcanizing press 12, the same will be assumed to be in the position of Figure 1, with the bead ejector ring 36 extending upwardly from the lower mold section 11 so as to be in the extended position illustrated, with tire T thereon. Additionally, with the mold sections 11 and 13 separated as illustrated in full lines in Figure 1, the spring 53 will have urged the bladder 50 into the withdrawn position such as is best illustrated in Figure 4. With the component parts in the just described positions, an uncured tire T may now be placed on the bead ejector ring 36 and at this time, the vulcanizing press 12 is ready for operation.

Initial closing movement between the mold sections 11 and 13 may be initiated by causing energization of the motor 20, that will result in corresponding rotational movement of the drive pinion 21 to accordingly cause equivalent rotation of the gear ring 22. With the gear ring 22 rotating as a result of the motor 20 being energized as has just been indicated, it will be assumed that the pin 23 will be moving through a counter-clockwise path of curvilinear movement; and as a result of this counter-clockwise movement, the pin 23 will move to the left and downwardly of Figure 1, with the result that the shaft 25 and the rollers 27 and 28 will move along the curved slot 29 towards the chain-dotted line position of Figure 1. At such time as the rollers 27 and 28 enter the vertical portion of slot 29, the upper mold section 11 will be rotated counter-clockwise about the axis defined by the shaft 25 to assume a condition of parallelism with regard to the lower mold section 13. At this time, further counter-clockwise movement of the pin 23 will result in the mold sections 11 and 13 approaching each other until the same are positioned as shown in Figure 2.

Just prior to the actual closing of the mold sections 11 and 13, the "flat-built" tire T will be distorted to the toroidal shape illustrated in Figure 2 as a result of being engaged by the bead seat 43 of the upper cavity molds 42. With the tire distorted in the mold sections 11 and 13 closed as just described, the bead ejector ring 36 will simultaneously have been moved downwardly to the retracted position illustrated in the full lines of Figure 2. At this time, the pneumatic former may be moved from its withdrawn position to a position interiorly of the distorted tire T by causing the entrance of pressurized fluid through the bumper valve 60. The entrance of pressurized fluid through the tubular member 61 will cause a force to be exerted against the top side of the circular head 57, with the result that the same will move downwardly against the force afforded by the spring 53 until such time as the head 57 is in the position of Figure 2; and at this time the incoming force of the pressure being admitted through the bumper valve 60 will cause the bladder 50 to be forced against the internal wall of the distorted tire T.

With the parts positioned as shown in Figure 2, vulcanizing medium may be now admitted through the bumper valve 60; it being understood that a vulcanizing medium could have been previously employed to lower the pneumatic former to the position illustrated in Figure 2. This entrance of vulcanizing medium under pressure, may be continued for a period of approximately five minutes, at which time the tire T will have been initially "cured" or "set"; and at this time, the entrance of the vulcanizing medium through the bumper valve 60 may be discontinued.

When this initial curing stage has been passed, the bladder 50 may be stripped with respect to the internal surface of the tire T, by causing the rod 52 to move upwardly as a result of the force offered by fluid entering the interior of the tire through the flexible conduit 38, which may be now be opened for this purpose. As will be best shown in Figure 3, the removal of the bladder 50 from the interior of the tire T is what may best be described as a "peeling" action, wherein the bladder 50 is gradually separated from its contact with the tire, so that no undue strain or stress is placed on either the bladder 50 or the tire T. When the spring 53, together with the force afforded by the incoming vulcanizing medium entering the conduit 38, has caused the head 57 to move to the position of Figure 3, it is manifest that additional fluid entering through the conduit 38 will cause the head 57 to be further retracted to the position of Figure 4. However, just before the position of Figure 4 is reached, the head 57 will strike the flange 64 of bumper valve 60 and the arresting or cushioning force afforded by this bumper mechanism 60 will prevent a sharp engagement from occurring between the head 57 and the dome 58. At such time as the head 57 is in the position of Figure 4, it is manifest that the bladder has been turned "inside out" from the position of Figure 2; and accordingly, any fluid medium that may have condensed and formed a fluid interiorly of the bladder 50 when the same was in the position of Figure 2, may now be withdrawn by causing an exhaust pressure to be applied to the bumper valve 60 to cause this condensate to be drawn upwardly through the port openings 65, 65 that are provided in the tubular element 62.

At this time, it will be seen that the interior surface of the tire is no longer protected by the bladder 50; and accordingly, superheated steam may be now introduced through the conduit 38 for direct application against the internal surface of the tire, and in this manner, a quick and highly efficient curing will be effectuated in a relatively short time.

When the curing operation has been completed as described, the motor 20 may be re-energized in the opposite direction, to cause separating movement between the mold sections 11 and 13, and as this separating movement continues, it is manifest that the bead ejector ring 36 will move upwardly from seat 33 to the chain-dotted line position of Figure 4, at which time the finished tire may be easily removed therefrom. Continued upward separating movement between the mold sections 11 and 13 will result in these mold sections being returned to the position of Figure 1, at which time the above cycles of operation may be repeated.

Figure 6:
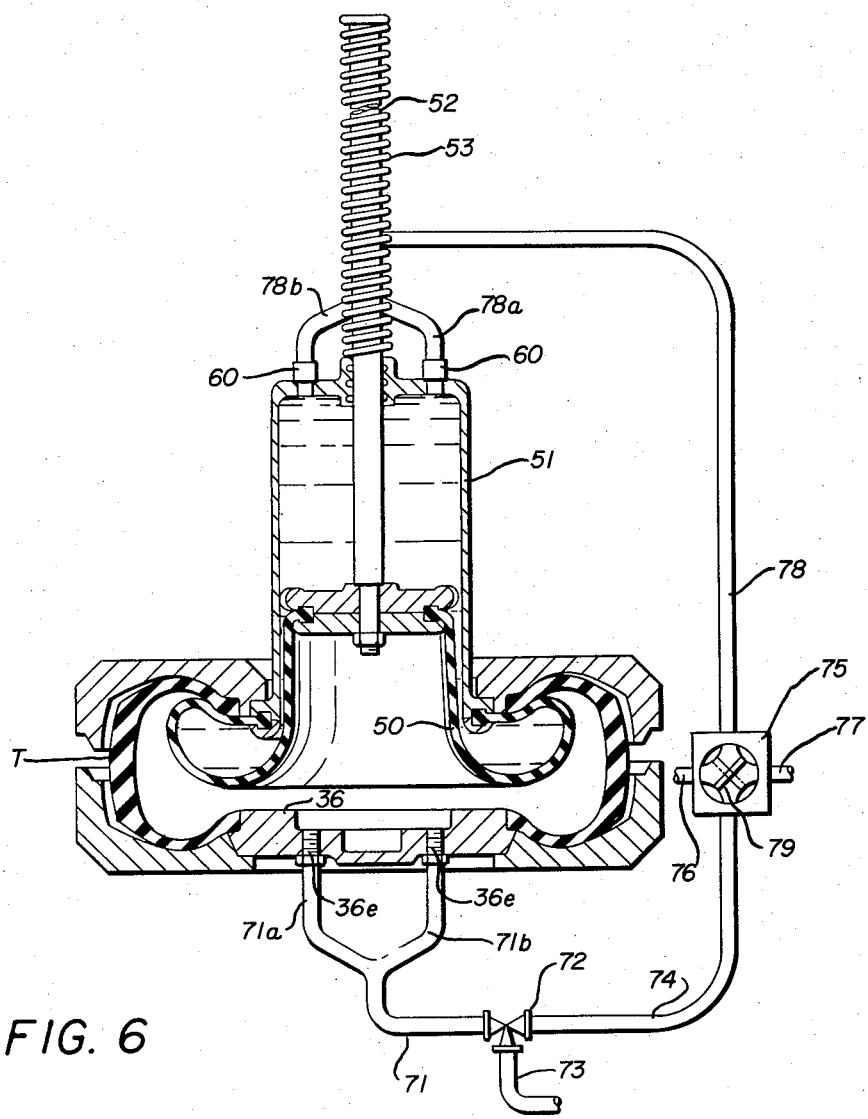
Figure 6 is a sectional view of a modified form of the invention.

In Figure 6 of the drawings there is illustrated, in operation, a modified form of the invention wherein the action of pneumatic former 10 is controlled by a valving means that is generally indicated as 75. The structural characteristics of the mold sections 11 and 13 are identical with the exception of the valving means 70, and accordingly, where indicated, like numerals indicate like parts shown and described in connection with Figures 1–5 of the drawings.

To this end, the modified form of the invention illustrated in Figure 6 is shown as having the ejector ring 36 provided with apertures 36e, 36e, that receive branches 71a, 71b of a supply line 71, that is in turn connected to one part of a three-way valve 72 that includes an exhaust line 73 and a fluid line 74 that interconnects the valve 72, with one part opening four-way control valve 75; the arrangement being such that fluid can be withdrawn from line 71 through line 73, or can be supplied to line 71 through line 74 depending upon the positioning of the valve 72.

Similarly, the valve 75 is shown as interconnecting fluid lines 76, 77 and 78; the lines 76 and 77 being provided respectively for supply and exhaust while the line 78 is divided into branches 78a, 78b that interconnect with connections 60, 60 to supply fluid interiorly of the former 10 as has been previously described. For the purpose of effectuating control of fluid flow in the lines 74, 76, 77 and 78, the valve 75 is shown as including the usual diverter blade 79 that may manually or automatically be moved between the full and chain-dotted line positions of Figure 6 to thus control fluid flow in a manner to be indicated.

The operation of the modified form of the invention can best be understood by considering Figure 6 of the drawings in connection with the various positions of the former 10 as illustrated in Figures 1, 2, 3 and 4 of the drawings. In Figure 1 the mold sections 11 and 13 are separated, and the diverter 79 of the valve 75 is positioned to exhaust fluid from line 78 into exhaust line 77; while the fluid supplied from line 76 is diverted to line 74 where its entrance to either lines 71 or 73 is blocked by valve 72.

When the mold sections 11 and 13 have been closed as previously described, the sleeve 50 may be moved to the position of Figure 6, which is intermediate of the positions shown in Figures 1 and 2 of the drawings, by moving the diverter blade 79 so that fluid from line 76 is diverted under pressure into line 78, whereupon the same may enter interiorly of the housing 51 through connections 60, 60 to cause the sleeve 50 to "float" into the position of Figure 6. At this point additional fluid will cause the sleeve 50 to assume the position of Figure 2 which may be maintained during the preliminary vulcanization.

When it is desired to withdraw the sleeve 50 from the interior of tire T, the valve 72 is first opened to permit flow between lines 74 and 71, and the diverter 79 may be moved to the chain-dotted position of Figure 6, whereupon fluid from supply line 76 will enter line 74; while fluid in line 78 will be exhausted through line 77. In this manner, as additional fluid is supplied through apertures 36e, 36e the entrapped fluid in housing 51 is forced into line 78 for exhaust through line 77, and accordingly, the sleeve 50 will be "peeled" from the tire T (as shown in Figure 3) for return to the position of Figure 4. When the sleeve 50 is in this position, vulcanizing is being effectuated directly against the interior of the tire T by medium entering through line 71, and when sufficient time has elapsed the valve 72 may be closed to the entrance of fluid from line 74, at which time fluid may be drained from line 71 for exhaust through exhaust line 73. Upon completion of the draining, the mold sections may be opened for repetition of the above cycle.

In the modified form of the invention above set forth, it is manifest that the valves 72 and 75 could be automatically operated in timed sequence; and it is to be understood that while the apparatus has been illustrated in conjunction with the shaping of a "flat-built" tire, that similar results could be obtained by using a "core-built" uncured tire.

It will be seen from the foregoing that there has been provided a new and novel method of vulcanizing pneumatic tires, featuring the use of a two-stage vulcanization cycle interiorly of the shaped tire that operates to materially reduce the overall period of time required for vulcanization of pneumatic tires. It has been also shown how the above operation is predicated upon the insertion and subsequent withdrawal of a pneumatic former from the interior of a shaped uncured tire being vulcanized, and it has been further illustrated how this insertion and removal is effectuated without the opening or closing of the mold sections. It has also been shown how the former of the improved press will last appreciably longer than those of the known prior art, in view of the fact that substantially equal hydraulic pressures are constantly maintained exteriorly and interiorly of the former, with the result that the same in effect, "floats" in the vulcanizing medium, and in this manner, all severe strains are obviated.

It accordingly follows that other modifications of the invention could be resorted to without departing from the spirit thereof or the scope of the appended claims.

What is claimed is:

1. A method of vulcanizing an uncured pneumatic tire positioned interiorly of the annular cavity of a vulcanizing press having a pneumatic former, comprising the steps of; shaping the uncured tire with said former into toroidal form; partially vulcanizing the interior of said uncured carcass while the same is maintained in said toroidal shape; withdrawing said former from the interior of said partially vulcanized tire while said press is closed and applying vulcanizing medium directly against the interior wall surface of said shaped and partially cured tire, until the same is completely vulcanized.

2. A method of vulcanizing an uncured pneumatic tire positioned interiorly of the annular cavity of a vulcanizing press having a pneumatic former, comprising the steps of; shaping the uncured tire with said former into toroidal form; vulcanizing an internal wall thickness of said shaped carcass less than the overall thickness thereof, whereby said carcass may be retained in said toroidal form by the rigidity of said cured wall thickness; withdrawing said former from the interior of said partially vulcanized tire while said press is closed; applying vulcanizing medium directly against the interior wall surface of said shaped and partially cured tire, until the same is completely vulcanized.

3. A method of vulcanizing an uncured pneumatic tire positioned interiorly of the annular cavity of a vulcanizing press having a pneumatic former, comprising the steps of; inserting said pneumatic former interiorly of said annular tire; inflating said pneumatic former with vulcanizing medium to simultaneously shape said tire into toroidal form while effectuating a preliminary vulcanization of said tire in said shaped form; withdrawing said former from the interior of said partially vulcanized tire while said press is closed; applying vulcanizing medium directly against the interior wall surface of said shaped and partially cured tire until the same is completely vulcanized.

4. A method of vulcanizing an uncured pneumatic tire positioned interiorly of the annular cavity of a vulcanizing press having a pneumatic former, comprising the steps of; inserting said pneumatic former interiorly of said annular tire of said pneumatic tire; inflating said pneumatic former with vulcanizing medium to shape said annular tire of said pneumatic tire into toroidal form; supplying vulcanizing medium interiorly of said shaped annular tire and partially vulcanizing said tire; withdrawing said pneumatic former from the interior of said partially vulcanized tire while said press is closed; applying vulcanizing medium directly against the interior wall surface of said shaped and partially cured tire until the same is completely vulcanized.

5. A vulcanizing press of the character described, comprising; a pair of complemental relatively movable mold sections defining an annular curing chamber when closed; an inflatable pneumatic former carried by one said mold section; a cylindrical housing carried by said mold section carrying said former; and means for moving said former between a position in said chamber and a position in said housing during the period that said press is closed; means for partially vulcanizing said tire when said former is positioned in said chamber; and means for finally vulcanizing said tire when said former is positioned in said housing.

6. A vulcanizing press of the character described, comprising; a pair of complemental relatively movable mold sections defining an annular curing chamber when closed; an inflatable pneumatic former carried by one said mold section; a cylindrical housing carried by said mold section carrying said former; and means for moving said former between a position in said chamber and a position in said housing during the period that said press is closed; means for partially vulcanizing said tire when said former is positioned in said chamber; and means for finally vulcanizing said tire when said former is positioned in said housing; said former being invaginated during movement between said position.

7. A vulcanizing press of the character described, comprising; a pair of complemental relatively movable mold sections defining an annular curing chamber when closed; an inflatable pneumatic former carried by one said mold section; a cylindrical housing carried by said mold section carrying said former; means for moving said former between a position in said chamber and a position in said housing during the period that said press is closed; means for partially vulcanizing said tire when said former is positioned in said chamber; and means for supplying vulcanizing medium to said chamber when said former is positioned in said housing.

8. A vulcanizing press of the character described, comprising; a pair of complemental relatively movable mold sections defining an annular curing chamber when closed; an inflatable pneumatic former carried by one said mold section; a cylindrical housing carried by said mold section carrying said former; and means for moving said former between a position in said chamber and a position in said housing during the period that said press is closed; means for partially vulcanizing said tire when said former is positioned in said chamber; and means for finally vulcanizing said tire when said former is positioned in said housing; said former including a resilient sleeve secured at one axial end to said mold section carrying the same and having the remaining axial end secured to a cylindrical head reciprocal concentrically of said housing.

9. A vulcanizing press of the character described, comprising; a pair of complemental relatively movable mold sections defining an annular curing chamber when closed; an inflatable pneumatic former carried by one said mold section; a cylindrical housing carried by said mold section carrying said former; and means for moving said former between a position in said chamber and a position in said housing during the period that said press is closed; means for partially vulcanizing said tire when said former is positioned in said chamber; and means for finally vulcanizing said tire when said former is positioned in said housing; said former including a resilient sleeve secured at one axial end to said mold section carrying the same and having the remaining axial end secured to a cylindrical head reciprocal concentrically of said housing; said sleeve, said housing and said head defining a closed chamber.

10. A vulcanizing press of the character described, comprising; a pair of complemental relatively movable mold sections defining an annular curing chamber when closed; an inflatable pneumatic former carried by one said mold section; a cylindrical housing carried by said mold section carrying said former; means for moving said former between a position in said chamber and a position in said housing during the period that said press is closed; means for partially vulcanizing said tire when said former is positioned in said chamber; and means for supplying vulcanizing medium interiorly of said chamber when said former is positioned in said housing.

11. A vulcanizing press of the character described, comprising; a pair of complemental relatively movable mold sections defining an annular curing chamber when closed; an inflatable pneumatic former carried by one said mold section; a cylindrical housing carried by said mold section carrying said former; means for moving said former between a position in said chamber and a position in said housing during the period that said press is closed; means for partially vulcanizing said tire when said former is positioned in said chamber; and means for supplying and exhausting vulcanizing medium interiorly of said chamber when said former is positioned in said housing.

12. A vulcanizing press of the character described, comprising; a pair of complemental relatively movable mold sections defining an annular curing chamber when closed; an inflatable pneumatic former carried by one said mold section, a cylindrical housing carried by said mold section carrying said former; means for moving said former between a position in said chamber and a position in said housing during the period that said press is closed; means for partially vulcanizing said tire when said former is positioned in said chamber; means for supplying vulcanizing medium to said chamber when said former is positioned in said housing; and means for supplying vulcanizing medium interiorly of said former when the same is positioned in said chamber.

13. A vulcanizing press of the character described, comprising; a pair of complemental relatively movable mold sections defining an annular curing chamber when closed; an inflatable pneumatic former carried by one said mold section; a cylindrical housing carried by said mold section carrying said former; means for moving said former between a position in said chamber and a position in said housing during the period that said press is closed; means for partially vulcanizing said tire when said former is positioned in said chamber; and means for finally vulcanizing said tire when said former is positioned in said housing; and means for normally urging said former to an axially collapsed condition.

14. The device of claim 5 further characterized by presence of bead ejector means carried by the remaining mold section.

15. The device of claim 12 further characterized by the presence of bead ejector means carried by the remaining mold section.

16. A vulcanizing press of the character described, comprising: a pair of complemental relatively movable mold sections defining, when closed, an annular cavity; means for effectuating relative movement between said mold sections whereby the same can be closed; an inflatable former of cylindrical shape carried by one said mold section; and means for inserting and withdrawing said inflatable former interiorly of said annular cavity during the period that said mold sections are closed; said inflatable former having at least one axial end thereof axially moved by said means, whereby said former is invaginated during said insertion and withdrawal, and means for partially vulcanizing a tire received in said annular cavity when said former is withdrawn from said cavity.

17. The device of claim 16 further characterized by the fact that said former is of cylindrical shape and has one axial end thereof fixed with respect to said mold section, while the other axial end thereof is shiftable between positions on opposed axial sides of said fixed axial end thereof during the period that said molds are closed.

18. A method of vulcanizing an uncured pneumatic tire positioned interiorly of the annular cavity of a vulcanizing press having a former, comprising the steps of: shaping said tire with said former to the configuration of said cavity; effectuating partial vulcanization of said shaped tire with said former positioned therein; withdrawing said former while said press is closed; and completing vulcanization of said partially vulcanized tire when said former is removed.

19. The method of claim 18 further characterized by the fact that said partial vulcanization is effectuated with super-heated steam.

20. The method of claim 18 further characterized by the fact that the last one of said vulcanizing steps is effectuated by the use of super-heated steam.

21. The method of claim 18 further characterized by the fact that said partial vulcanization is effectuated with super-heated steam, while said final vulcanization is effectuated with regular steam.

22. A method of vulcanizing an uncured pneumatic tire positioned interiorly of the curing chamber of a vulcanizing press having a former, comprising the steps of: shaping and partially vulcanizing said tire with said former positioned therein to the configuration of said cavity; withdrawing said former while said press is closed; completing vulcanization of said tire with said former withdrawn and said press closed.

23. A vulcanizing press of the character described comprising; a pair of complemental relatively moveable mold sections defining when closed an annular cavity; means for effectuating relative movement between said mold sections, whereby the same can be closed; an inflatable former of cylindrical shape carried by one said mold section; means for inserting and withdrawing said inflatable former interiorly of said annular cavity during the period that said mold sections are closed; means for supplying vulcanizing medium interiorly of said former when the same is positioned within said cavity; and means for supplying vulcanizing medium interiorly of said cavity when said former is withdrawn from said cavity.

References Cited in the file of this patent

UNITED STATES PATENTS

| | | |
|---|---|---|
| 2,032,508 | Seiberling et al. | Mar. 3, 1936 |
| 2,337,857 | Soderquist | Dec. 28, 1943 |
| 2,431,916 | Ceasar | Dec. 2, 1947 |
| 2,559,119 | Frank | July 3, 1951 |
| 2,699,572 | Soderquist | Jan. 18, 1955 |
| 2,730,763 | Brundage | Jan. 17, 1956 |